United States Patent Office 2,708,653
Patented May 17, 1955

2,708,653

PURIFICATION OF PYRIDINE BASES BY DISTILLATION

William E. Sisco, Bound Brook, and John S. Wiederecht, Somerville, N. J., assignors to American Cyanamid Company, New York, N. Y., a corporation of Maine No Drawing. Application February 18, 1954, Serial No. 411,282

15 Claims. (Cl. 202—57)

This invention relates to the production of water-white, color-stable pyridine bases.

In crude form, as obtained, for example, from coal coking operations or from synthetic production, pyridine and its homologs, such as the picolines, the lutidines and collidines, contain a variety of impurities. These may include pyrrole and pyrrole derivatives, hydrogen cyanide, hydrogen sulfide, sulfur dioxide, ammonium sulfide, a variety of unsaturated compounds, and the like. Some of these impurities in the crude accompany the pyridine bases through any normal refining process based on distillation alone and appear in the refined products. These impurities are undesirable in the refined pyridine bases which are to be used as reagents or solvents. Their presence in the normally refined bases renders them, on standing, unsuitable for use in the preparation of pharmaceutical chemicals and dyestuffs because the impurities, through polymerization or oxidation, cause discoloration of the pyridine bases.

For many uses, especially as reagents in the preparation of pharmaceutical chemicals or dyestuffs, it is extremely important that color-stable, water-white pyridine be used. Attempts have been made in the past to obtain color-stable pyridine bases, but, in general, the processes have not been industrially feasible on all crude pyridine bases. For example, it has been proposed to purify pyridine in the vapor phase with metal oxides, but this treatment requires expensive and complicated equipment. It has also been proposed to purify pyridine by treatment with alkaline earth metal or alkali metal syanamides, but in actual practice this process can be used economically only for special uses such as the preparation of pyridine for hydrogenation. It has also been proposed to refine pyridine bases by refluxing with aqueous caustic, but this treatment suffers from the disadvantage of requiring the separation of the pyridine from the spent caustic and a separate drying step over solid caustic soda before the pyridine bases can be distilled.

In accordance with the present invention, we have discovered a novel process of producing color-stable, water-white pyridine bases which can be carried out in ordinary distillation equipment and which does not involve the use of any expensive or complicated equipment or the employment of extra and costly purification steps which are inherent in the processes of the prior art.

Essentially, the present invention comprises distilling a substantially anhydrous mixture of impure or crude pyridine bases, a basic metal hydroxide and an alkaline oxidizing agent as more particularly described hereinafter. The distillates so obtained are free of impurities, are water-white and retain this desirable color stability indefinitely. The final products are usable directly as solvents or as reagents; or by controlled fractionation in the distillation step, the individual pyridine bases may be obtained as pure compounds which are color stable and which are highly useful as reagents in the preparation of pharmaceutical chemicals or dyestuffs.

It is an advantage of this invention that it is essentially, so far as the number of unit operations is concerned, merely a distillation step. There is no increase in the time of distillation and there is no need for extra purification steps before distillation of the pyridine bases. Therefore, the disadvantages of the prior art processes outlined hereinbefore are completely obviated by the present invention.

It is an essential feature of the present invention that the mixture of crude pyridine bases, basic metal hydroxide and alkaline oxidizing agent be substantially anhydrous. This may be accomplished by drying the pyridine bases with a suitable azeotroping agent. Such drying can be carried out either before mixing the pyridine bases with a basic metal hydroxide and an alkaline oxidizing agent; or preferably, the azeotroping agent along with the alkali and the oxidizing agent may be added at the beginning of the distillation, and the dehydration and separation of the pyridines can be accomplished without interruption. In this embodiment of the present invention, the water is first removed by azeotroping. The azeotroping agent is then separated by fractionation, and the pyridine bases are then subjected to further distillation in the presence of the alkali and the oxidizing agent to produce the refined pyridine bases of the present invention.

The azeotroping agent which may be used to dry the mixture must have the property of forming azeotropes with water but preferably not with the pyridine bases. The agent must also have a boiling point sufficiently low to permit its effective separation from the pyridine bases by distillation. An example of a suitable azeotroping agent is benzene. The next higher homolog of benzene, namely, toluene is not preferred when pyridine itself is present in the pyridine bases because the boiling point of toluene and pyridine are too close to permit easy separation. However, if higher boiling homologs of pyridine are present in the mixture of pyridine bases and pyridine itself is absent, toluene can be used as an azeotroping agent in the process. Consultation of a table of azeotropic mixtures, such as appear in Analytical Chemistry 19, 508–609 (1947) will readily provide the necessary information for the choice of a suitable azeotroping agent in the present process. The amount of azeotroping agent to be used will depend on the type of distillation equipment used for the process. In equipment which permits the azeotrope to stand while the water and azeotroping agent form separate layers, the latter being recycled to the distillation pot, the amount of agent used is solely a function of the dimensions of the equipment. When such recycling is not possible, sufficient azeotroping agent will be needed to remove substantially all the water and the amount added will be a function of the proportion of water present.

The oxidizing agents which may be used are those whose reduction products are not less basic than themselves. This definition can be illustrated by the example of the persulfates, which are not operative in this process. The doubly negative persulfate ion forms two doubly negative sulfate ions as by-products when persulfate is used as an oxidizing agent. The total number of negative ions is thus increased. In contrast thereto, the oxidizing agents which are operable either form no increased number of negative ions or actually increase the number of hydroxyl ions which are present. In other words, the basicity either remains the same or becomes increased. Among the oxidizing agents which may be used are potassium permanganate, sodium dichromate, sodium perborate, sodium peroxide, sodium hypochlorite, and the halogenates such as sodium chlorate and sodium bromate. Obviously, other alkali metal or alkaline earth metal salts of these ions such as permanganates, dichromates, perborates, etc. may also be used.

The amount of alkaline oxidizing agent present may be of the order of about 0.1% by weight of the crude pyridine bases being distilled. As a practical operating procedure, it is usually preferred that not over about 1% by weight of the oxidizing agent, with respect to the pyridine bases, be used. Quantities much in excess of this value should be avoided in order to reduce the amount of oxidation of the alkyl pyridines as well as to keep the cost of the operation within economical bounds.

The basic metal hydroxides which are employed in the present process are the hydroxides of the alkali metals and the alkaline earth metals and thus include such hydroxides as sodium hydroxide, potassium hydroxide, caesium hydroxide, barium hydroxide, calcium hydroxide, etc. A minimum usage of 1% by weight, based on the pyridine bases used, is ordinarily necessary and in practical operations, in order to keep the process economic, a maximum usage of 10% is all that is usually necessary.

It should be pointed out that each source of crude pyridine will have its own characteristic minimum quantities of reagents required to effect the desired purification. These main requirements can easily be determined experimentally for each source of pyridine bases. Once a sufficient minimum has been determined, it will remain effectively constant for the pyridine bases obtained from that source. Small variations in such minimum usage are in practice usually provided against by using a slight excess of the reagents above the determined minimum usage.

The present process may effectively be carried out in at least two ways. In the first, the crude pyridine is charged into a still. The requisite quantities of basic metal hydroxide and oxidizing agent are added to the charge followed by an azeotroping agent as described hereinbefore. The distillation is begun and the mixture is dried by distilling over the azeotrope in a suitable apparatus so that the water carried over in the azeotrope is allowed to settle and the azeotroping agent is recycled to the mixture. When the mixture is substantially anhydrous, the azeotroping agent is removed by distillation after which the distillation is continued and the stable, water-white refined pyridine bases are collected either together or in separate cuts as desired. Alternatively, the crude pyridine bases can be first dehydrated by azeotropic distillation as described above and the basic metal hydroxide and oxidizing agent can then be added to the dry mixture. Distillation first separates the azeotroping agent and then permits the collection, as desired, of the stable, water-white pyridine bases.

In a preferred process of carrying out the present invention, a preliminary fractionation of the crude pyridine bases may be made in order to strip the bases from the phenolic impurities which are usually present. The distillate so obtained can then be treated with reduced quantities of basic metal hydroxide and oxidizing agent by either of the foregoing-described methods so as to produce the water-white, color-stable pyridine bases of this invention.

The expression "pyridine bases" as used throughout the specification and claims is used to denote pyridine itself, and its lower alkyl homologs including the picolines, the lutidines and the collidines. These pyridine bases may be the products of coal coking operations or of synthetic production.

Some crude pyridines are more difficult to refine than others because of differences in the processes for recovery of the crudes from the coke oven operations. The present process is of particular value in the production of water-white, color-stable products from the more difficultly refined crudes but is, of course, advantageous also in the production of acceptable products from the more easily refined crudes. While the present process has its greatest utility in the refining of crude pyridine bases as obtained from coke oven operations, it is to be understood that it is also applicable to synthetic pyridine and substituted pyridines as may be synthesized, for example, by the condensation of acetaldehyde with ammonia, or by reaction of acetylene with ammonia or possibly by the hydrogenation of coal. The present process is also applicable to pyridine which has been used in and recovered from many of the processes in which pyridine is normally used.

The invention will be described in greater detail in conjunction with the following specific examples in which the parts are by weight unless otherwise specified.

*Example 1*

To 1000 parts of crude pyridine bases obtained from coking operations there was added 40 parts of sodium hydroxide and 2 parts of potassium permanganate. The mixture was stirred to promote solution of the reagents. 180 parts of benzene was added and the reaction mixture was dehydrated by distilling the benzene-water azeotrope, and collecting the latter in such a way that the water settled and the benzene was recycled to the reaction mixture. When substantially all the water was removed, the distillation of the mixture was begun. The benzene was recovered as the first fraction after which fractions composed, respectively, of pyridine, alpha-picoline, mixed picolines and higher boiling components were obtained. The refined pyridine base fractions thus obtained were water-white and color-stable.

*Example 2*

To 1000 parts of crude pyridine bases there was added 60 parts of sodium hydroxide and 4 parts of potassium permanganate. The mixture was agitated to promote solution of the reagents and then was azeotropically dehydrated as in Example 1. After the azeotroping agent had been removed by fractionation, the pyridine base mixture was separated into the same four fractions as in Example 1. The refined products so obtained were water-white and color-stable for an indefinite period.

*Example 3*

4000 parts of crude pyridine bases were distilled to a vapor temperature of about 160° C. The end temperature of this distillation was adequate to leave most of the phenols as still residue. 80 parts of sodium hydroxide and 8 parts of potassium permanganate were added to the distillate and the mixture was dehydrated azeotropically as in Example 1. After removal of the dehydrating agent, the refined pyridines were obtained by fractionation as water-white, color-stable liquids meeting all the requirements for use in the preparation of pharmaceutical chemicals and dyestuffs.

*Example 4*

To 500 parts of stripped coal tar bases there was added 10 parts of sodium hydroxide and 5 parts of sodium dichromate. The mixture was azeotropically dehydrated as in Example 1. The azeotroping agent was removed, and the refined pyridines were recovered by fractionation as in Example 1. The products were water-white and color-stable.

*Example 5*

The process of Example 4 was followed substituting 5 parts of sodium perborate for the sodium dichromate. The refined pyridines, which were recovered by fractionation, were water-white and color-stable.

*Example 6*

The process of Example 4 was followed substituting 5 parts of sodium peroxide for the sodium dichromate. The refined pyridines, which were recovered by fractionation, were water-white and color-stable.

*Example 7*

The process of Example 4 was followed substituting 5 parts of sodium hypochlorite for the sodium dichromate. The refined pyridines, which were recovered by fractionation, were water-white and color-stable.

Example 8

The process of Example 4 was followed substituting 5 parts of sodium chlorate for the sodium dichromate. The refined pyridines, which were recovered by fractionation, were water-white and color-stable.

Example 9

2000 parts of crude pyridine bases were distilled to a vapor temperature of about 160° C. The end temperature of this distillation was adequate to leave most of the phenols as still residue. 40 parts of potassium hydroxide and 4 parts of potassium permanganate were added to the distillate and the mixture was dehydrated azeotropically as in Example 1. After removal of the dehydrating agent, the refined pyridines were obtained by fractionation as water-white, color-stable liquids meeting all the requirements for use in the preparation of pharmaceutical chemicals and dyestuffs.

Example 10

The procedure of Example 9 was followed substituting 40 parts of barium hydroxide for the potassium hydroxide used therein. The refined pyridines, which were recovered by fractionation, were water-white and color-stable. Similar results were obtained when equivalent quantities of calcium hydroxide and caesium hydroxide, respectively, were substituted for the potassium hydroxide.

Example 11

In 100 parts of synthetic pyridine bases prepared by reacting acetylene with ammonia and which were off-color there was added 0.2 parts of potassium permanganate and 2 parts of sodium hydroxide. The mixture was azeotropically dehydrated as in Example 1. The azeotroping agent was removed by distillation and further distillation of the mixture produced a water-white, color-stable product. Another sample of the same starting material was distilled without the addition of either the potassium permanganate or sodium hydroxide. This distilled product showed color development within 48 hours.

This application is a continuation-in-part of our application Serial No. 378,427 filed September 3, 1953, now abandoned.

We claim:

1. The method of producing color-stable, water-white pyridine bases which comprises subjecting a substantially anhydrous mixture of crude pyridine bases, a basic metal hydroxide and an alkaline oxidizing agent, whose reduction products are not less basic than itself, to distillation and recovering the thus purified pyridine bases.

2. The method according to claim 1 in which the basic metal hydroxide and the alkaline oxidizing agent are present to the extent of at least 1% and 0.1%, respectively, by weight of the crude pyridine bases.

3. The method according to claim 2 in which the basic metal hydroxide is sodium hydroxide and in which the alkaline oxidizing agent is potassium permanganate.

4. The method of producing color-stable, water-white pyridine bases which comprises subjecting a mixture of crude pyridine bases, a basic metal hydroxide, an alkaline oxidizing agent, whose reduction products are not less basic than itself, and an azeotroping agent to distillation in order to dehydrate the mixture, continuing the distillation so as to remove the azeotroping agent, and distilling the remaining mixture so as to recover the thus purified pyridine bases.

5. The method according to claim 4 in which the azeotroping agent is benzene.

6. The method according to claim 4 in which the basic metal hydroxide and the alkaline oxidizing agent are present to the extent of at least 1% and 0.1%, respectively, by weight of the crude pyridine bases.

7. The method according to claim 6 in which the azeotroping agent is benzene.

8. The method according to claim 7 in which the basic metal hydroxide is sodium hydroxide and in which the alkaline oxidizing agent is potassium permanganate.

9. The method according to claim 6 in which the alkaline oxidizing agent is sodium hypochlorite.

10. The method according to claim 6 in which the alkaline oxidizing agent is sodium dichromate.

11. The method of producing color-stable, water-white pyridine bases which comprises subjecting a mixture of crude pyridine bases made by carbonization of coal, at least 1% of sodium hydroxide by weight of the pyridine bases, at least 0.1% of potassium permanganate by weight of the pyridine bases and an azeotroping agent to distillation in order to dehydrate the mixture, continuing the distillation so as to remove the azeotroping agent, and fractionally distilling the remaining mixture so as to recover the thus purified pyridine bases as separate fractions.

12. The method according to claim 11 in which the azeotroping agent is benzene.

13. The method according to claim 11 in which the pyridine bases used are synthetic pyridine bases.

14. The method according to claim 11 in which the pyridine bases used are synthetic pyridine bases made by the condensation of acetaldehyde with ammonia.

15. The method according to claim 11 in which the pyridine bases used are synthetic pyridine bases made by the reaction of acetylene with ammonia.

References Cited in the file of this patent

UNITED STATES PATENTS

| | | |
|---|---|---|
| 1,290,124 | Downs | Jan. 7, 1919 |
| 2,016,426 | Goost et al. | Oct. 8, 1935 |
| 2,363,157 | Stasse | Nov. 21, 1944 |